Nov. 18, 1952  A. L. BRADLEY  2,618,312
VEHICLE SEAT
Filed Feb. 24, 1947  3 Sheets-Sheet 1

INVENTOR.
Arthur L. Bradley
BY Barnes, Kisselle,
Laughlin & Raisch
ATTORNEYS

Nov. 18, 1952  A. L. BRADLEY  2,618,312
VEHICLE SEAT
Filed Feb. 24, 1947  3 Sheets-Sheet 2
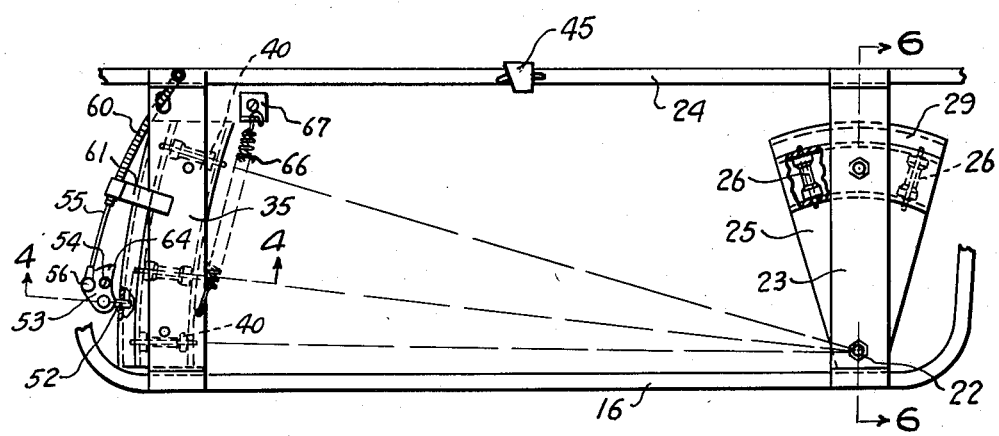
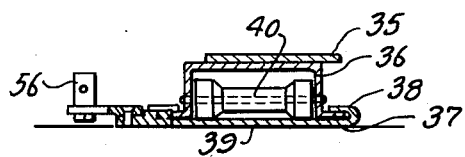
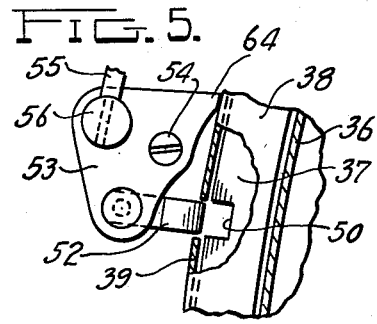
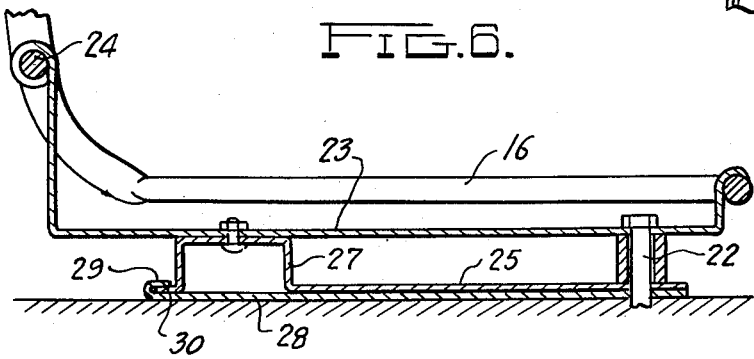
INVENTOR.
Arthur L. Bradley
BY Barnes, Kisselle,
Laughlin & Raisch
ATTORNEYS

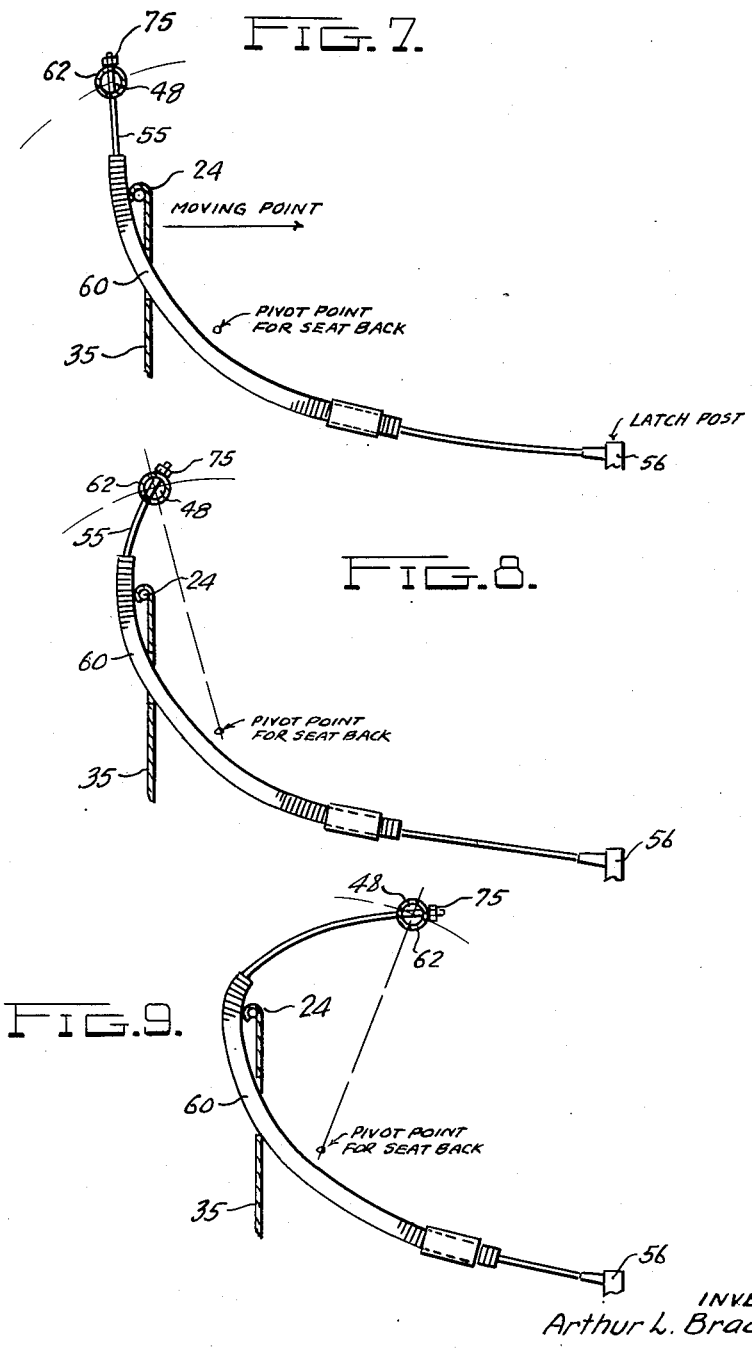

Patented Nov. 18, 1952

2,618,312

UNITED STATES PATENT OFFICE 2,618,312

VEHICLE SEAT

Arthur L. Bradley, Royal Oak, Mich.

Application February 24, 1947, Serial No. 730,289

7 Claims. (Cl. 155—14)

This invention relates to a vehicle seat.

In vehicles having two doors adjacent the front of the passenger carrying portion, it is necessary for the occupants of the rear seat to enter and leave through the front doors. In order to provide more clearance for egress and ingress, front seats of vehicles have been pivotally located so that one end would swing toward the front of the vehicle to open up the passageway to the back seat. Patents such as that to Roberts, 1,903,267 of March 28, 1933, Greig 2,189,396 of February 6, 1940, and Riley 2,246,076 of June 17, 1941, disclose this type of seat.

The present invention contemplates an improvement over these patented constructions in a mechanism designed such that the movement of the pivoted back of the seat unlocks the front seat and causes motion of the seat forward; thus when the back of the seat is split, the driver can apply forward and downward force to the right-hand back of the seat and cause the right end of the front seat to shift forwardly. The seat may also be operated by an occupant in the back seat or a person standing outside the car.

Thus it is an object of the invention to provide a force arrangement in which the same motion and the same parts will cause the unlocking operation and subsequently shift the seat.

It is a further object of the invention to provide a novel force multiplying mechanism which effects easy shifting of the seat.

Other objects and features of the invention will be apparent as the description progresses.

In the drawings:

Figure 3 is a plan view of the lower seat frame and mounting structure.

Figure 4 is a sectional view on line 4—4 of Figure 3.

Figure 5 is an enlarged view of the locking mechanism.

Figure 6 is a sectional view on line 6—6 of Figure 3.

Figures 7, 8, and 9 illustrate the operating mechanism in various stages of movement.

Figure 1:
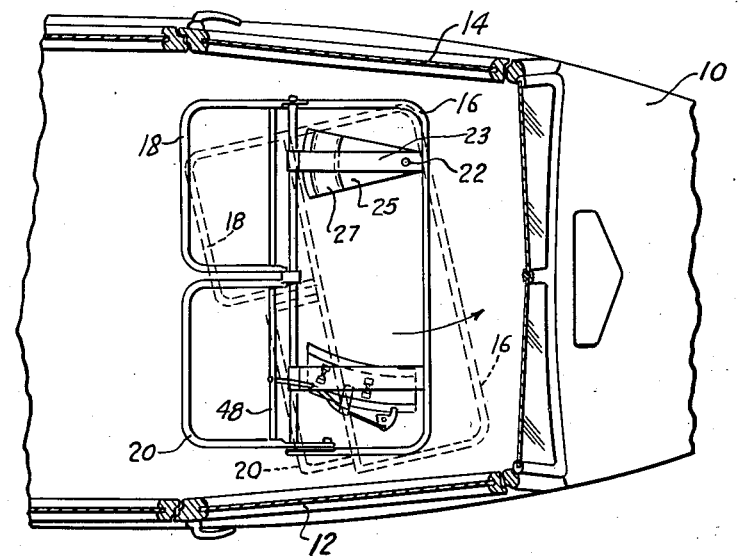
Figure 1 is a plan view of a vehicle, diagrammatic in nature, illustrating the pivotal motion of the seat.

In Figure 1 a portion of a vehicle is shown with a forward end 10, two front doors 12 and 14 and a skeleton seat designated by a seat frame 16 and two back frames 18 and 20.

Figure 2:
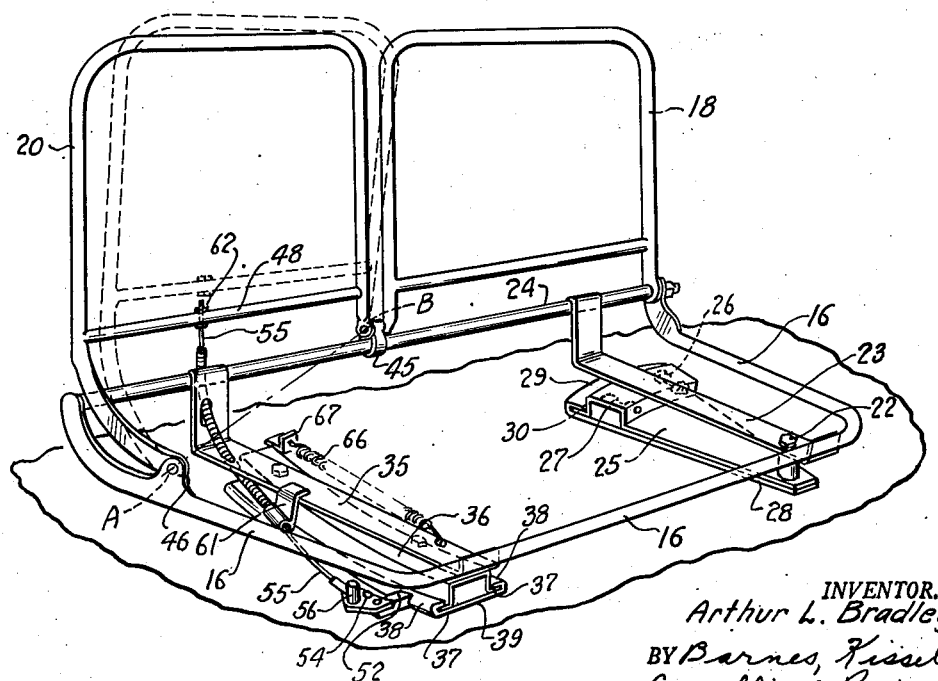
Figure 2 is a skeleton view of a seat illustrating the operating mechanism.

In Figure 2, the seat frame 16 is shown pivotally mounted at 22 by a cross strap 23 fastened between the front rail of frame 16 and a back rail 24. The rear portion of the strap 23 is fastened to a triangular guidepiece 25 which shifts on rollers 26 (Figure 3) located in an arcuate channel 27 of the guidepiece. The triangular guidepiece 25 is pivoted at 22 on a base plate 28 which has an arcuate flange 29 hooked over the arcuate end 30 of plate 25 to stabilize the movement and form a guide for the end of the plate 25.

The other end of the seat frame 16 is provided with a cross strap 35 between the front end of the frame 16 and the back cross bar 24. An arcuate channel member 36 is fastened to the strap 35 with side flanges 37 which track under the turned in edges 38 of an arcuate base plate 39. Rollers 40 (Figure 4) are interposed between the channel 36 and the base plate 39 to remove the friction between the two pieces.

The frame 16 is thus mounted for free pivotal movement around the point 22, and the left-hand end of the seat, as viewed in Figure 2, is intended to move forwardly of the vehicle as shown in Figure 1.

The back of the seat is formed by two frames 18 and 20. The frame 18 is pivoted at one end on the cross bar 24 and at the other end on a supporting lug 45 mounted on cross bar 24. This back 18 has a forward movement, that is, the pivot line is parallel with the axis of the seat. The other back frame 20 is pivoted at one end on the lug 45 and at the other end on a tab portion 46 formed on the side of frame 16. The line of pivot of the frame 20 is at an angle to the frame as shown by the line A—B connecting the pivot points of frame 20. Back frame 20 has a cross bar 48 adjacent the bottom thereof, the function of which will be described later.

A locking means is provided for the free end of the seat to prevent accidental shifting thereof. As shown in Figure 5, a notch 50 is formed in the edge 37 of channel 36 under the edge 38 of base plate 39. A latch 52 passes through a hole in the edge 33 of plate 39 to engage the notch 50. Latch 52 is mounted on a triangular swivel plate 53 pivoted at 54 so that the latch may be withdrawn from the notch 50 to disengage the lock. The pivotal plate 53 is actuated by a wire 55 which is fastened at point 56 to the corner of plate 53. The wire passes through and is anchored in a stud at 56 which is also pivoted to the plate 53. A flexible casing or sheath 60 for the wire 55 has one end fastened at a bracket 61 on strap 35 and passes through strap 35 at two points and up around behind bar 24 where it terminates shortly above the bar. The other end of the wire is fastened to the cross bar 48 of frame 20 at 62. This flexible sheath and wire combination is commonly referred to as a Boden wire. The wire 55 is of high quality steel which gives it great flexibility and great resilience. Other flexible members may be used, of course, as equivalents of the flexible wire.

In the operation of the shifting seat when it is desired to move the free end forward, the back frame 20 is moved forward and down. In the first action the lifting of the end 62 of the wire 55 will tension it to cause a pivotal action of plate 53 around point 54, thus disengaging latch 52 from notch 50. This frees the end of the seat and further movement of the back portion of the seat downward about its hinge points causes shifting of the wire, and brings a heel portion 64 on plate 53 to a stop position in contact with the side 38 of plate 39. Since swivel plate 53 is anchored, the continued movement of the other end of the wire causes the wire 55 and sheath 60 to bow around the bar 24 which serves as a fulcrum, thus forcing the free end of the seat forward. This action is illustrated in Figures 7 to 9 where the movement and the changing shape of the wire is set forth. It will be seen that as the cross bar 48 on the back frame 20 is lifted and moved away from the cross bar 24 of the lower seat frame, the seat frame must move forward since the point 56 is stationary with respect to the vehicle. The tensioning of the wire, therefore, forces the free end of the seat frame forward. There is considerable mechanical advantage in the mechanism when force is applied to the top of the seat back.

On the return movement, a spring 66 comes into action, Figures 2 and 3. This spring is connected at one end to strap 35 and at the other end to an L bracket 67 fastened to the vehicle. The forward movement elongates the spring 66 and upon release of the force against the back frame 20, the spring will aid in the return of the seat to its normal position. A wire 55 which is relatively large in cross-section will permit return force to be exerted on the actuating seat back and serve as a compression member to effect seat return. In some cases where a small wire 55 is used, it is desirable to provide a slip fit between the bar 48 and the wire 55 so that in tension the wire will function to move the seat forward but return movement of the seat may be accomplished directly with the help of the spring action. A slight starting pressure on the seat proper supplemented by the action of the spring 66 will cause the seat to move readily back into position. To provide this slip fit on the wire 55, the end 62 of the wire 55 will have a nut 75, Figure 7, threaded thereon or a washer applied over the end and the wire riveted over the washer.

It will be understood that the entire mounting means described could be in turn mounted on a device to provide fore and aft adjustment as is common today. Likewise the sliding arrangement between the parts could be provided with any standard friction removing means without departing from the spirit of the presently disclosed invention.

What I claim is:

1. In combination with a seat assembly for a vehicle wherein a seat frame is mounted such that at least one end will shift relative to the vehicle to facilitate egress and ingress, a manually operable pivoted member and a flexible tension member having a slip connection at one end with a movable portion of said pivoted member and anchored at the other end with respect to the vehicle, said slip connection permitting application of tension only on said flexible member, said flexible member passing around and in contact with a portion of the seat frame whereby movement of the pivoted member causes a translation of said flexible member and a resultant shifting of said seat frame.

2. In combination with a seat assembly for a vehicle wherein a seat frame is mounted such that at least one end will shift relative to the vehicle to facilitate egress and ingress, and having a back portion pivoted on the seat frame for forward tilting, a fastening point on the vehicle, a fastening point on the back portion, a fulcrum portion on the seat comprising a guide means, and a wire connecting said fastening points and threaded over said guide means to effect movement of said seat relative to the vehicle upon manual shifting of the hinged back portion by reason of a shortening of the cable between said guide means and the fastening point on the vehicle.

3. In a vehicle seat of the type in which a seat frame extends transversely of the vehicle and is pivotally mounted such that one end will swing forwardly of the vehicle, a hinged back portion pivoted at the base thereof at a point forward of the back of the seat frame, a cable, a fastening means for one end of said cable on said back above the frame positioned to move upward and forward as the seat back is shifted on its pivot, a fastening means on the vehicle below the seat frame and generally forward of the seat at the swinging end of the frame, a fulcrum guide means at the rear of the seat frame below the fastening means on the back, said cable connecting said means and being relatively taut between said fastening means whereby pivoting of the back portion relative to the seat frame causes tightening of the cable and forces the seat frame forward at the swinging end.

4. A vehicle seat moving apparatus as described in claim 3 in which the fastening means on the vehicle is a moving portion of a lock which holds the swinging end of the seat in one position until tension is placed on the cable, the motion of the moving portion of the lock being limited to permit such portion to serve as an anchor point as the seat moves forward.

5. In combination, a vehicle, a seat frame on said vehicle shiftable thereon to facilitate egress and ingress, a seat back on said frame mounted to fold from an upright position toward said seat in jack-knife fashion, a cable, means fastening said cable to said vehicle below said frame, means fastening said cable to said back above said frame, said cable passing around the back of the frame and up to the fastening point of the seat back and being relatively taut when said back is upright, whereby folding of said seat back toward said seat will tighten said cable at the back of the seat frame and force the frame to shift relative to the vehicle.

6. In combination, a vehicle, a seat frame on said vehicle shiftable thereon to facilitate egress and ingress, a seat back pivotally mounted to fold from an upright position on said frame having an L-shaped portion, the base of the L being pivoted at the free end to the frame at a point forward of the back of the frame, the upright leg of the L extending upward above the back of the frame, an operating cable, means fastening said cable to said seat back above the back of the frame, means fastening said cable to said vehicle below said frame and forward of the pivot point of the L-shaped portion, said cable passing around the back of the frame and being relatively taut when said back is in upright position, whereby folding of said back toward said seat will tighten said cable at the back of the seat frame and force the frame to shift relative to the vehicle.

7. In combination with a seat assembly for a vehicle wherein a seat frame is mounted such that at least one end will shift relative to the vehicle to facilitate egress and ingress, a hinged seat back portion pivoted at its base to the frame to fold toward the seat frame, a fastening means on the vehicle below the seat frame, a fastening means on the seat back portion above the seat frame, a fulcrum portion at the back of the seat frame, and flexible tension means extending between and held by said fastening means and passing around said fulcrum portion in pulley fashion to effect movement of said seat frame relative to the vehicle upon manual shifting of the hinged back portion toward said frame.

ARTHUR L. BRADLEY.

REFERENCES CITED

The following references are of record in the file of this patent:

UNITED STATES PATENTS

| Number | Name | Date |
|---|---|---|
| 1,636,078 | Schreiber | July 19, 1927 |
| 1,903,267 | Roberts | Mar. 28, 1933 |
| 1,942,070 | Smelker | Jan. 2, 1934 |
| 2,189,396 | Greig | Feb. 6, 1940 |
| 2,246,076 | Riley | Jan. 17, 1941 |